United States Patent
Mitra

(10) Patent No.: US 9,746,677 B2
(45) Date of Patent: Aug. 29, 2017

(54) DEVICE FOR APPLYING LASER RADIATION TO THE OUTSIDE OF A ROTATIONALLY SYMMETRIC COMPONENT

(71) Applicant: LIMO Patentverwaltung GmbH &Co KG, Dortmund (DE)

(72) Inventor: Thomas Mitra, Dortmund (DE)

(73) Assignee: LIMO PATENTVERWALTUNG GMBH & CO. KG, Dortmund (DE)

( * ) Notice: Subject to any disclaimer, the term of this patent is extended or adjusted under 35 U.S.C. 154(b) by 0 days.

(21) Appl. No.: 14/890,145

(22) PCT Filed: May 14, 2014

(86) PCT No.: PCT/EP2014/059828
§ 371 (c)(1),
(2) Date: Nov. 9, 2015

(87) PCT Pub. No.: WO2014/184233
PCT Pub. Date: Nov. 20, 2014

(65) Prior Publication Data
US 2016/0116750 A1      Apr. 28, 2016

(30) Foreign Application Priority Data
May 15, 2013    (DE) ........................ 10 2013 104 986

(51) Int. Cl.
*G02B 27/09*     (2006.01)
*G02B 27/12*     (2006.01)
(Continued)

(52) U.S. Cl.
CPC ...... *G02B 27/0927* (2013.01); *B23K 26/0648* (2013.01); *B23K 26/282* (2015.10);
(Continued)

(58) Field of Classification Search
USPC ....................... 250/492.1; 356/136, 328, 446
See application file for complete search history.

(56) References Cited

U.S. PATENT DOCUMENTS

| | | | |
|---|---|---|---|
| 4,826,269 A | 5/1989 | Streifer et al. | |
| 4,929,084 A * | 5/1990 | Mast ........................ | G01J 3/02 356/328 |

(Continued)

FOREIGN PATENT DOCUMENTS

| | | |
|---|---|---|
| CN | 101490597 A | 7/2009 |
| DE | 102008027231 A1 | 10/2009 |

(Continued)

OTHER PUBLICATIONS

M. Traub et al., Homogenization of high power diode laser beams for pumping and direct applications, Proceedings of SPIE for Optical Engineering, US, vol. 6104, Feb, 9, 2006; German Search Report for 10 2013 104 986.9, dated Sep. 12, 2013; International Search Report of PCT/EP2014/059828, mailed Sep. 24, 2014.

(Continued)

*Primary Examiner* — Kiet T Nguyen
(74) *Attorney, Agent, or Firm* — Cohen & Hildebrand, PLLC

(57) ABSTRACT

The invention relates to a device for applying laser radiation (13) to the outside of a rotationally symmetric component (11), comprising a plurality of lenses (10), which are designed and/or arranged in such a way that the axis of symmetry (12) of the component (11) lies at the focal point of each of the lenses (10).

33 Claims, 7 Drawing Sheets

(51) Int. Cl.
B23K 26/06 (2014.01)
B23K 26/282 (2014.01)
B29C 65/16 (2006.01)
G21K 5/02 (2006.01)

(52) U.S. Cl.
CPC .......... *B29C 65/16* (2013.01); *B29C 65/1687* (2013.01); *G02B 27/0955* (2013.01); *G02B 27/0961* (2013.01); *G02B 27/0994* (2013.01); *G02B 27/12* (2013.01); *G21K 5/02* (2013.01)

(56) References Cited

U.S. PATENT DOCUMENTS

| | | |
|---|---|---|
| 8,416,500 B2 | 4/2013 | Mitra et al. |
| 2002/0100748 A1 | 8/2002 | Andersen |
| 2009/0128804 A1* | 5/2009 | Namiki .................. G01N 21/43 356/136 |

FOREIGN PATENT DOCUMENTS

| | | |
|---|---|---|
| JP | 2003260583 A | 9/2003 |
| JP | 2009244316 | 10/2009 |
| WO | 2014001277 | 1/2014 |

OTHER PUBLICATIONS

German Search Report for counterpart application DE 10 2013 104 986.9, Sep. 12, 2013 (5 pages).
International Search Report of counterpart application PCT/EP2014/059828, dated Sep. 24, 2014 (12 pages).

* cited by examiner

Fig. 3
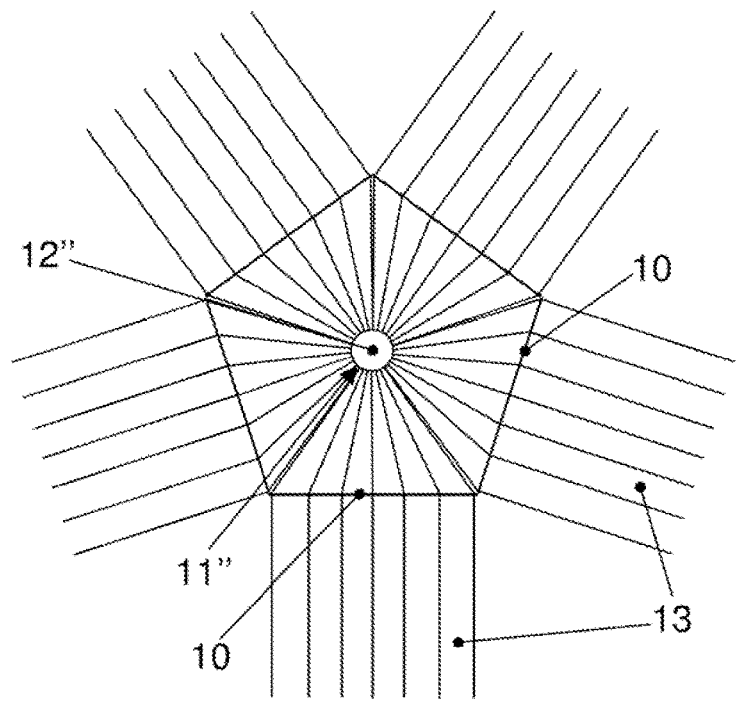
Fig. 4
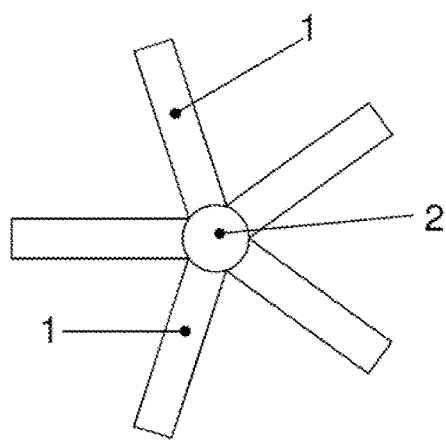
Fig. 5
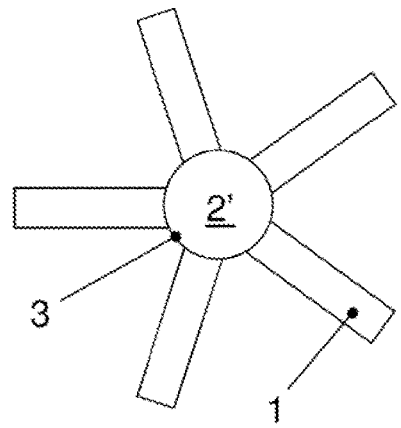
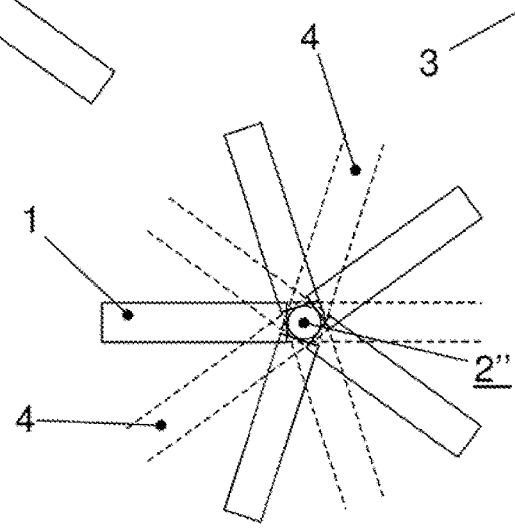
Fig. 6

_US 9,746,677 B2_

DEVICE FOR APPLYING LASER RADIATION TO THE OUTSIDE OF A ROTATIONALLY SYMMETRIC COMPONENT

This is an application filed under 35 USC §371 of PCT/EP2014/059828 filed on May 14, 2014 claiming priority to DE 10 2013 104 986.9 filed on May 15, 2013.

BACKGROUND OF THE INVENTION

The present invention relates to a device for applying laser radiation to the outside of a rotationally symmetrical component.

DEFINITIONS

In the propagation direction of the laser radiation, the average propagation direction of the laser radiation is identified, in particular when the laser radiation is not a plane wave or is at least partially divergent. Laser beam, light beam, partial beam or beam does not, unless expressly stated otherwise, refer to an idealized beam of the geometrical optics, but to a real light beam, such as a laser beam with a Gaussian profile or a modified Gaussian profile or a top hat profile, which does not have an infinitesimally small, but an extended beam cross-section.

Diode lasers are often used when welding rotationally symmetric, in particular circular-cylindrical plastic parts from the outside. Typically, two methods or device types are used. In a first prior art device, a beam is moved around the component, or the component rotates in a laser beam. The disadvantage of such device is that parts have to be moved and welding does not take place simultaneously. This may adversely affect the quality of the weld.

In a second prior art device, several for example divergent beam sources illuminate the part from an annular arrangement. FIG. 4 shows schematically such a device where five laser beams 1 are incident on a rotationally symmetrical component 2 from five different directions.

Such devices have the disadvantage that the angles at which the component 2 is irradiated are different at the surface of the component 2. Reflection and absorption therefore vary across the component. Furthermore, a defined illumination can be achieved only for a fixed diameter of the component (see FIG. 4). When the diameter of the component 2' is larger, parts 3 of the surface are not exposed to laser radiation (see FIG. 5). When the diameter of the component 2" is smaller, a part 4 of the laser radiation bypasses the component 2' (see FIG. 6).

BRIEF SUMMARY OF THE INVENTION

The problem underlying the present invention is to provide a device of the aforementioned type, wherein the exposure to the laser radiation is comparatively independent of the diameter of the component and/or wherein the laser radiation incident on the outside of the component has a homogeneous angular distribution.

This is attained by the invention with a generic device having the features of claim 1. The dependent claims relate to preferred embodiments of the invention.

According to claim 1, the device has a plurality of lenses which are configured and/or arranged such that the axis of symmetry of the component is at the focal point of each of the lenses. Such an arrangement ensures that laser radiation passing through the lens and incident on the component has a homogeneous angular distribution. This homogeneous angular distribution can, on the one hand, ensure that the outside of the component is homogeneously exposed to laser radiation in the circumferential direction, wherein the absorption and reflection of the laser radiation then also does not change along the periphery due to the identical incident angle. On the other hand, the homogeneous angular distribution of the laser radiation can help to ensure that components having different diameters can be optimally exposed to laser radiation.

The device may include homogenizing means capable of homogenizing the laser radiation before passing through the lenses. In this manner, a high degree of homogeneity of the angular distribution incident onto the component of the laser radiation is ensured.

For example, when the number of lenses is less than eight, the homogenizing means may be designed in such a way that the laser radiation has a top-hat intensity distribution with an intensity that decreases toward the edges according to $\cos^2(\phi)$, whereas the homogenizing means may be designed, when the number of the lenses is greater than or equal to eight, in such a way that the laser radiation has a linear top-hat intensity distribution.

The homogenizing means may include one, preferably two lens arrays or a light guide.

Alternatively, the homogenizing means may include a waveguide with an at least partially cuboidal light-guiding region.

A first extent of the light-guiding region which extends between an entrance face and an exit surface of the light-guiding region may be greater than a second and/or a third extent of the light-guiding region perpendicular to the first extent, preferably by a factor of at least 3, particularly by a factor of at least 7, for example by a factor of at least 10 greater, and/or may preferably be greater by a factor of at most 100, especially of at most 50, for example, of at most 40. With this design, for example, a homogeneous intensity distribution that decreases slightly toward the edge, for example as $\cos^2(\phi)$, can be created.

At least two or each of the lenses may have the same focal length. With this measure, the device can be constructed coaxially in relation to the symmetry axis of the component, thereby making it easier to achieve a homogeneous angular distribution of the incident laser radiation on the component.

The device may include at least one laser light source, preferably a plurality of laser light sources that can generate laser radiation incident on the component. In particular, a laser light source may be assigned to each of the lenses. Suitable laser light sources are, for example, a laser diode bar or fiber-coupled diode lasers.

The device may include optical means, which can apply laser radiation to at least one or each of the lenses, in particular laser radiation emitted by the at least one laser light source. The optical means may include, for example, imaging or focusing lenses. Furthermore, the optical means may include the homogenizing means.

For example, the optical means and/or the homogenizing means may be designed such that a homogeneous spatial distribution or a homogeneous spatial intensity distribution of the laser radiation is incident on the entrance face of each of the lenses. By way of the lenses, a homogeneous spatial distribution is converted into a homogeneous angular distribution.

Alternatively, the optical means and/or the homogenizing means may be designed such that a spatial distribution that is matched to the design of the lens or a spatial intensity distribution of the laser radiation that is matched to the design of the lens is incident on the entrance face of each of the lenses. For example, spatial intensity distributions that gently decrease toward the edges may be incident on lenses that are similar to ideal lenses, thereby contributing to an even more homogeneous intensity distribution on the component. In other lens designs, for example in real lenses or F-Theta lenses, other suitable spatial intensity distributions or spatial distributions of the laser radiation may be incident on the lenses.

The optical means may include collimating means, in particular at least one lens for collimation, that are configured and arranged in the device such that the laser radiation is incident on the lenses with no divergence or with the lowest possible divergence, or at least substantially collimated. The collimation of the laser radiation incident on the lenses contributes to an increase in the homogeneity of the intensity distribution incident on the component.

At least one or each of the lenses may be cylindrical lenses with cylinder axes parallel to the symmetry axis of the component. In this way, an annular intensity distribution is obtained on the outside of the component which corresponds to the length of the cylinder axes of the lenses in the direction of the axis of symmetry of the component. This intensity distribution can be moved, for example, as part of a machining process in the direction of the axis of symmetry of the component.

Alternatively, at least one or each of the lenses may have a rotationally symmetrical curvature, and more particularly may be spherical lenses. In this way, a very narrow annular intensity distribution is produced on the outside of the component. This intensity distribution can, for example, also be moved in the course of a machining process in the direction of the axis of symmetry of the component. Furthermore, this intensity distribution can also be used to generate a continuous peripheral weld.

The lenses may be arranged next to each other, in particular may adjoin each other, in the circumferential direction with respect to the axis of symmetry of the component. In this way, it can be ensured by using simple means that a uniform intensity distribution of the laser radiation is attained over the entire circumference of the component.

Furthermore, at least one or each of the lenses may be arranged so that the direction in which the laser radiation propagates after passing through the at least one or each of the lenses has both a radial, as well as an axial component with respect to the axis of symmetry of the component. In this way, none of the laser light sources can be damaged by laser radiation reflected on the component or by laser radiation bypassing the component.

Alternatively or additionally, the device may include a beam trap constructed to capture the laser radiation reflected by the component and/or bypassing the component and/or portions of the laser radiation transmitted through the component, wherein the beam trap has in particular an annular shape. With such a beam trap, laser radiation reflected on the component or laser radiation bypassing the component or laser radiation passing through a partially transparent component is prevented from damaging any of the laser light sources.

BRIEF DESCRIPTION OF THE DRAWINGS

Additional features and advantages of the present invention will become apparent from the following description of preferred embodiments with reference to the accompanying drawings, wherein

FIG. 3 shows a diagram corresponding to FIG. 1 with a third rotationally symmetric component;

FIG. 4 shows a schematic diagram of a device according to the prior art with a first rotationally symmetric component;

FIG. 5 shows a diagram corresponding to FIG. 4 with a second rotationally symmetric component;

FIG. 6 shows a diagram corresponding to FIG. 4 with a third rotationally symmetrical component;

DETAILED DESCRIPTION OF THE INVENTION

Figure 1:
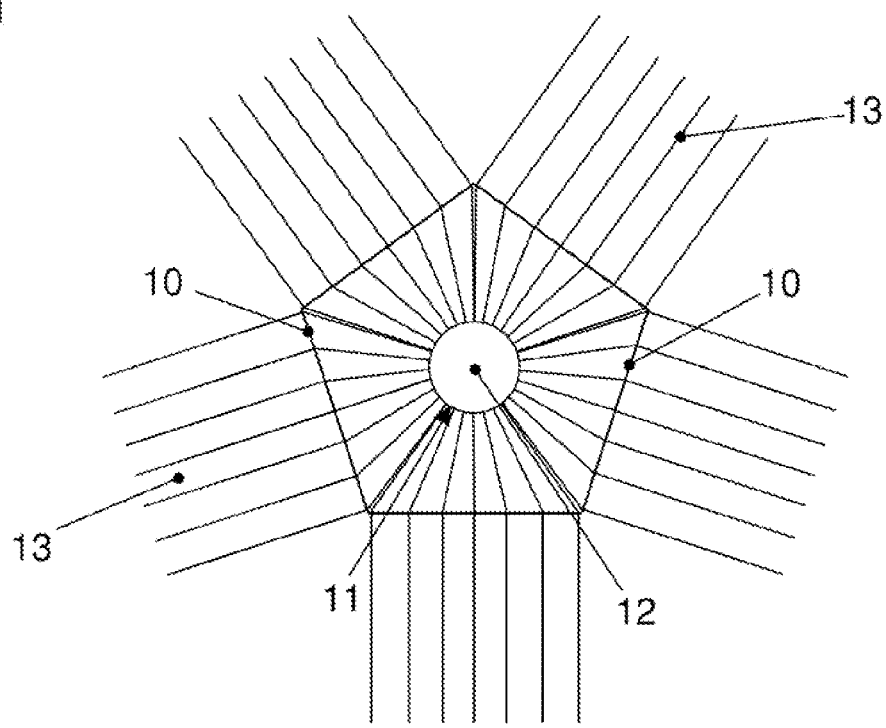
FIG. 1 shows a schematic diagram of a device according to the invention with a first rotationally symmetric component.

In the figures, identical or functionally identical parts are provided with identical reference numerals.

Figure 2:
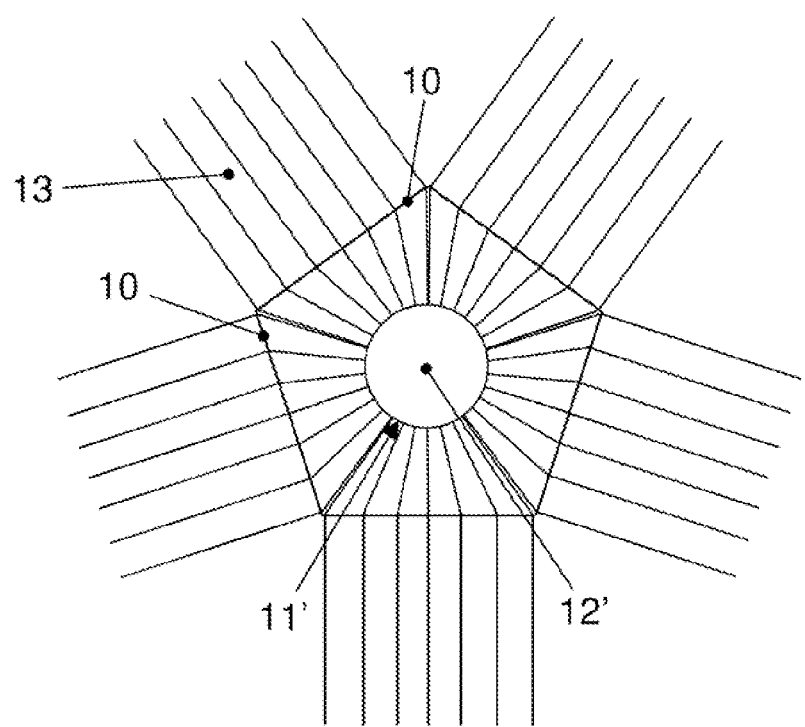
FIG. 2 shows a diagram corresponding to FIG. 1 with a second rotationally symmetric component.

The embodiment of a device according to the invention illustrated in FIG. 1 to FIG. 3 includes five lenses 10. These lenses 10 are only schematically indicated in the figures by a respective line. The lenses 10 may be, for example, piano-convex or bi-convex or concave-convex lenses.

Less than five lenses, in particular two or three or four lenses, or more than five lenses may conceivably be provided.

The five lenses 10 are arranged on the sides of a regular pentagon parallel to these sides so that the lenses 10 adjoin each other at the corners of the pentagon. The focal length of each of the lenses 10 is identical and is selected so that the focus or the focal point or the focal line of all lenses is located at the same position.

When a greater or a smaller number of lenses are used, the lens arrangement is changed accordingly so that for example with four lenses the lenses are arranged on the sides of a square. With only two lenses, the lenses are arranged parallel to each other and opposite from one another and spaced from one another.

In the illustrated exemplary embodiment, the lenses 10 may be formed as cylindrical lenses having cylinder axes that are parallel to each other and extend in the plane of drawing. In this case, each of the lenses 10 has a focal line or a focus line. However, the lenses 10 may also each have a rotationally symmetrical curvature, and may in particular be spherical lenses. In this case, each of the lenses 10 a focal point or a focus point.

A rotationally symmetrical component 11, in particular a circular cylinder (see FIG. 1) which extends in the drawing plane of FIG. 1 without any change in cross-section, is arranged intermediate between the lenses 10. The component 11 is arranged such that the foci of the lenses 10 are located on the axis of symmetry 12 and the cylinder axis of the component 11.

The device may further include at least one laser light source, preferably a plurality of laser light sources corresponding to the number of lenses and optical means constructed to apply the laser radiation 13 emanating from the laser light sources to the lenses. The optical means may include in particular collimation means, for example a plurality of lenses for collimation, which are configured and arranged in the device such that the laser radiation is incident on the lenses 10 with no divergence or with the smallest possible divergence or is at least substantially collimated.

FIG. 1 shows as an example five laser beams 13 which are each incident from the outside perpendicular on the entrance faces of the lenses 10 facing away from the component. The laser beams 13 are merely indicated schematically. In particular, the laser beams 13 should each have a homogeneous spatial distribution or a homogeneous spatial intensity distribution on the entrance faces of the lenses 10.

The laser beams 13 are each transformed by the lenses 10 so that the laser beams 13 each have a homogeneous angular distribution after exiting from the exit faces of the lenses 10 facing the component. As a result, the same laser power is incident on each peripheral section of the outside of the component 11, whereby the angles of incidence are also identical.

FIG. 2 shows the device from FIG. 1, wherein a component 11' which has an axis of symmetry 12' and a larger diameter than the component 11 is positioned between the lenses 10. As it turns out, the outside this component 11' is then also homogeneously illuminated.

FIG. 3 shows the device from FIG. 1, wherein, a component 11" which has an axis of symmetry 12" and a smaller diameter than the component 11 is arranged between the lenses 10. As it turns out, the outside this component 11" is then also homogeneously illuminated. Furthermore, in contrast to the embodiment shown in FIG. 6, no laser radiation bypasses the component 11".

The numerical aperture (NA) of the lenses 10 and their illumination can be selected so that with the selected number of lenses 10 the entire angular space of the circumference of the component 11, 11', 11" is illuminated. The numerical aperture of the lenses can here be determined as follows:

$$NA=\sin(\alpha/2)$$

with $\alpha=360°$/number of lenses.

Therefore, at least four lenses 10 are probably as realistic number in practice, because lenses with very large numerical aperture (NA>0.8) are difficult to produce.

In order to ensure a homogeneous angular distribution of the individual laser beams 13 after the passage through the lenses 10, the lenses 10 should be illuminated with a homogeneous spatial distribution. The slow-axis distribution of laser diode bars is particularly suitable for this purpose. Accordingly, laser diode bars can be selected as the laser light sources. The slow-axis distribution can also be homogenized additionally. Corresponding homogenizing means will be described in more detail hereinafter with reference to FIGS. 7 to 12.

Another suitable laser light source is a fiber-coupled diode laser. In this example, the fiber near field which is often relatively homogeneous can be imaged onto the lenses 10.

Acylindrical lenses can be selected as lenses with a large numerical aperture, in special cases also round aspheres or cylindrical Fresnel lenses.

In all variants, antireflection coatings disposed on the lenses should advantageously have an equally good transmission for all angles.

The smallest diameter d of the component 11, 11', 11" can be deduced from the divergence of the laser radiation 13 incident on the lens 10, wherein all the laser radiation 13 impinges on the surface of the component 11, 11', 11". In a good F-Theta-approximation, the smallest diameter d is obtained as $$d=\theta\cdot f,$$

wherein $\theta$ corresponds to the full divergence angle of the incident laser radiation and f corresponds to the focal length of the lenses 10.

The largest diameter selectable for the component 11, 11', 11" is defined by the space available between the lenses 10. The diameter can be selected to be so large that the outside of the component 11, 11', 11" abuts the exit faces of the lenses 10. In practice, the maximum diameter can be chosen to be somewhat smaller in order to prevent an excessive amount of dirt from hitting the lenses 10.

At least one lens 10 or each of the lenses 10 may be arranged so that the direction in which the laser radiation 13 spreads after passing through the at least one lens 10 or through each of the lenses 10 has with respect to the axis of symmetry 12, 12', 12" of the component 11, 11', 11" both a radial as well as an axial component.

This can be achieved by tilting the lenses 10 relative to the axis of symmetry 12, 12', 12", so that the laser radiation 13 does not extend in the drawing plane of FIG. 1 to FIG. 3 after passing through the lenses 10, but is instead tilted upwardly or downwardly by a few angular degrees. This has the advantage that the laser radiation 13 reflected on the component 11, 11', 11" or the laser radiation 13 bypassing the component 11, 11', 11" cannot damage any of the laser light sources.

Furthermore, an unillustrated beam trap may be provided, which may in particular have an annular shape. This beam trap can then capture the laser radiation reflected by the component 11, 11', 11" and/or transmitted through the component.

Figure 7:
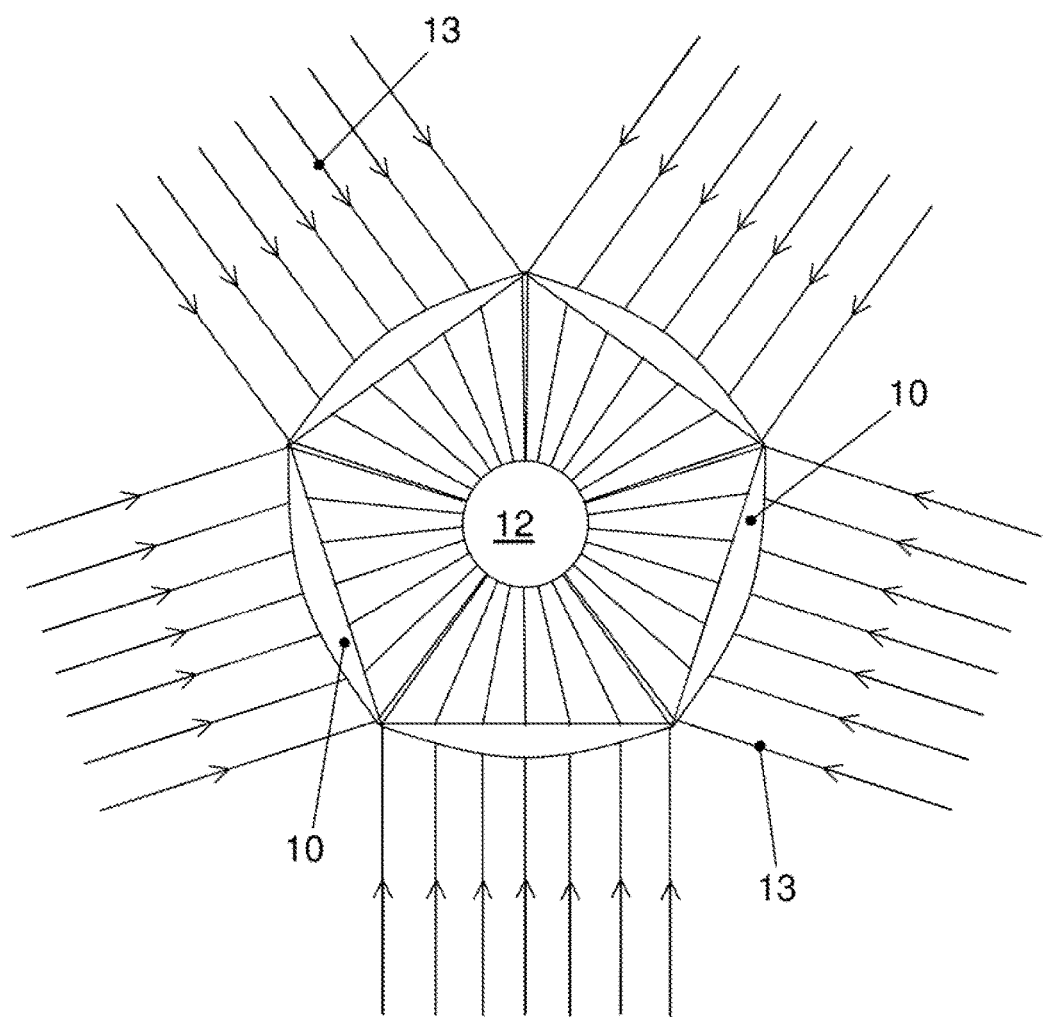
FIG. 7 shows a diagram corresponding to FIG. 1 of a device according to the invention with lenses formed as piano-convex lenses.

FIG. 7 shows an exemplary device according to the invention, wherein the lenses are designed as plano-convex lenses 10. Like in the example shown in FIG. 1, five lenses 10 are arranged on the sides of a regular pentagon. However, as already mentioned above, less than five lenses 10, in particular two or three or four lenses 10, or more than five lenses 10, for example, six, seven, eight, nine or ten or more lenses 10, may be provided, wherein the lenses 10 are arranged in a regular arrangement, for example, on a square, a regular hexagon or a regular octagon. Furthermore, the lenses 10 are arranged so that adjacent lenses 10 contact each other or adjoin one another.

Figure 8:
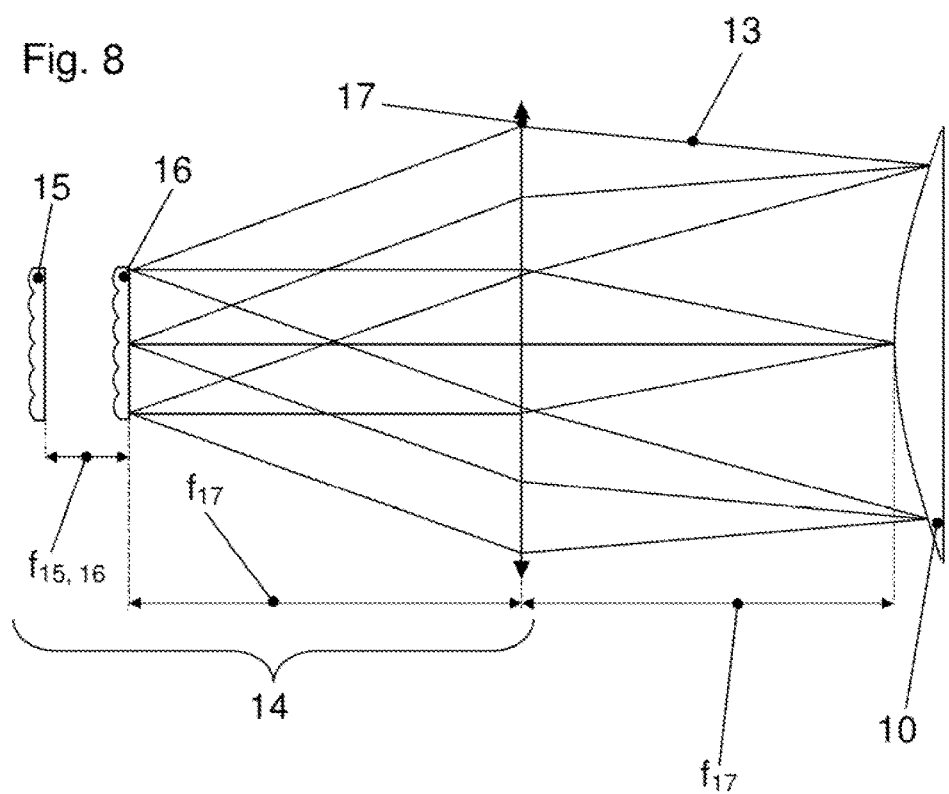
FIG. 8 shows a detailed view of a device according to the invention with a first embodiment of homogenizing means.

FIG. 8 shows a first embodiment of homogenizing means 14, which include two lens arrays 15, 16 as well as a merely schematically indicated lens 17. The lens 17 is arranged in the device so that the exit face of the second lens array 16 is disposed in the input-side focal plane of the lens 17 and the entrance face of the lens 10 is disposed in the exit-side focal plane of the lens 17. Here, the focal lengths $f_{15, 16}$ of the individual lenses of the lens arrays 15, 16 are significantly smaller than the focal length $f_{17}$ of the lens 17. The lens arrays 15, 16 may be cylindrical lens arrays with cylinder axes that extend in the drawing plane of FIG. 8. Furthermore, the lens 17 may also be a cylindrical lens with a cylinder axis extending into the drawing plane of FIG. 8.

Only one lens of the lenses 10 for exposing the component 11 to laser radiation 13 is shown by way of example. However, a number of homogenizing means 14 corresponding to the number of lenses 10 shall be provided, so for example six lenses 10 and six homogenizing means 14 associated therewith or, for example, eight lenses 10 and eight homogenizing means 14 associated therewith.

Figure 9:
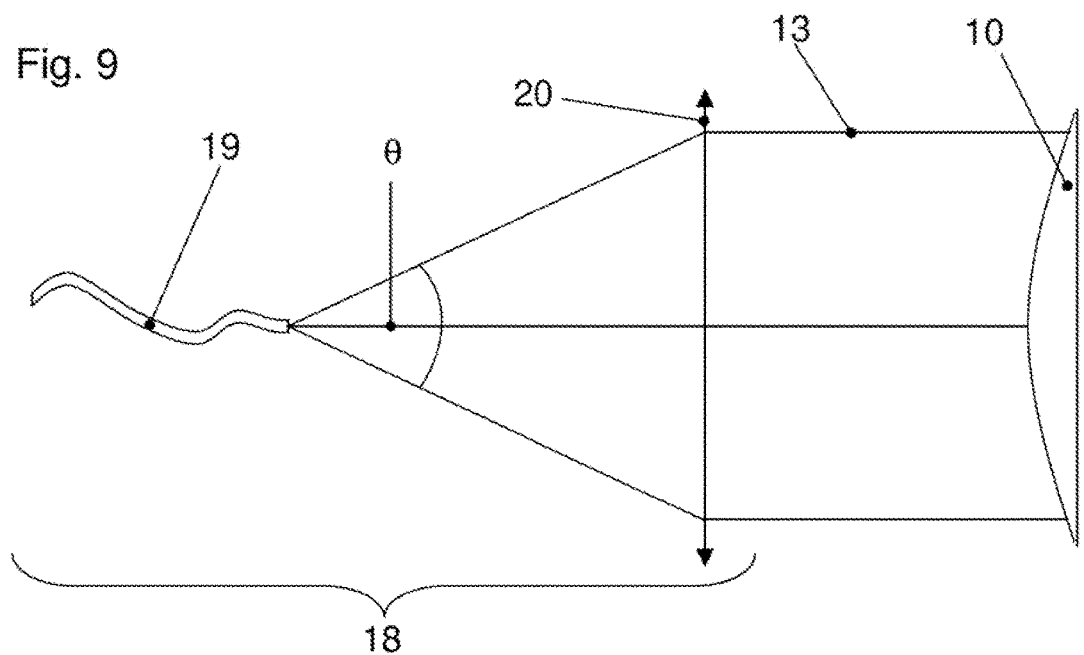
FIG. 9 shows a detailed view of a device according to the invention with a second embodiment of homogenizing means.

FIG. 9 shows a second embodiment of homogenizing means 18, which include an optical fiber 19 and an only schematically indicated lens 20. The comparatively homogeneous light from a fiber-coupled laser exits the end of the optical fiber 19. This homogeneous distribution is collimated by the lens 20 and propagates from the latter to the entrance face of the lens 10. The lens 20 may be a cylindrical lens with a cylinder axis extending in the drawing plane of FIG. 9.

The distance between the end of the optical fiber 19 and the lens 20 corresponds to the focal length $f_{20}$ of the lens 20. In FIG. 9, the divergence angle $\theta$ of the exiting light is shown somewhat exaggerated for a better illustration. Realistic divergence angles $\theta$ are between 12° and 26°.

Only one lens of the lenses 10 for exposing the component 11 to laser radiation 13 is shown by way of example. However, the number of homogenizing means 18 should correspond to the number of lenses 10, so for example six homogenizing means 18 should be associated with six lenses 10 or, for example, eight homogenizing means 18 should likewise be associated with eight lenses 10.

Figure 10:
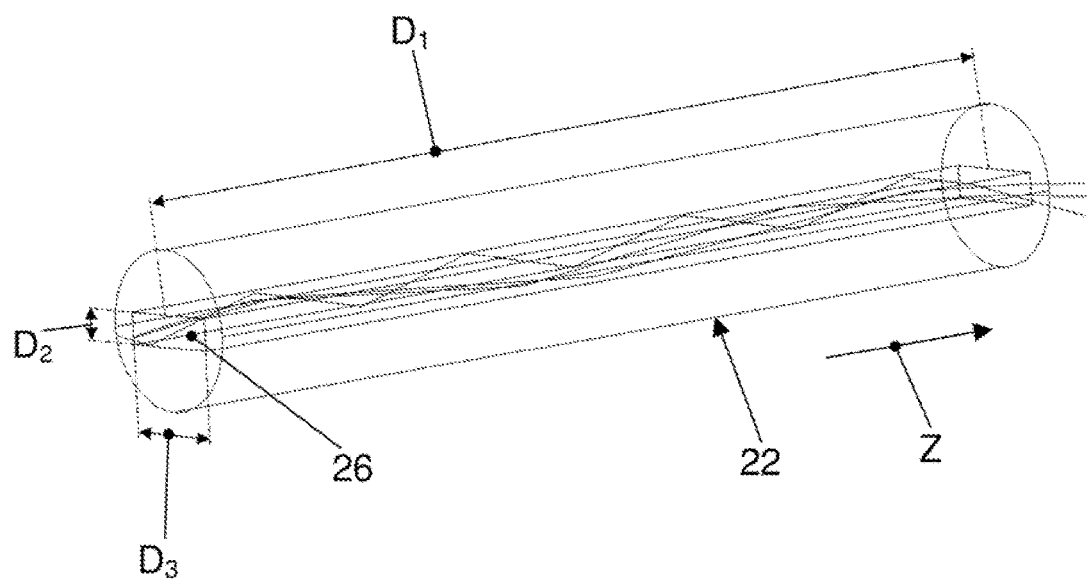
FIG. 10 shows a perspective view of a third embodiment of homogenizing means.
Figure 12:
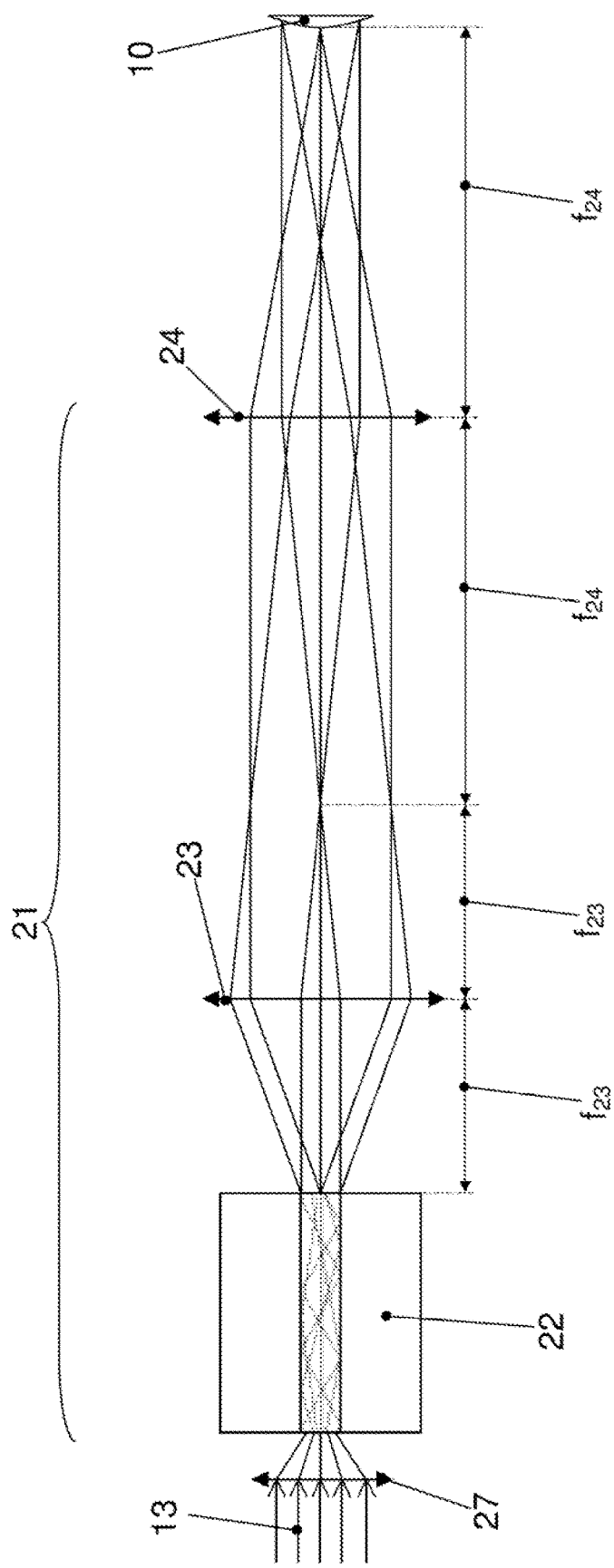
FIG. 12 shows a detailed view of a device according to the invention with the third embodiment of homogenizing means.

FIG. 12 shows a third embodiment of homogenizing means 21, which include a schematically indicated waveguide 22 and a telescope composed of two lenses 23, 24. The lenses 23, 24 may be cylindrical lenses with cylinder axes extending into the drawing plane of FIG. 9. The waveguide 22 is shown in FIG. 10 in greater detail and corresponds to a waveguide previously disclosed in WO 2014/001277. WO 2014/001277 is incorporated in the present application by reference.

Figure 11:
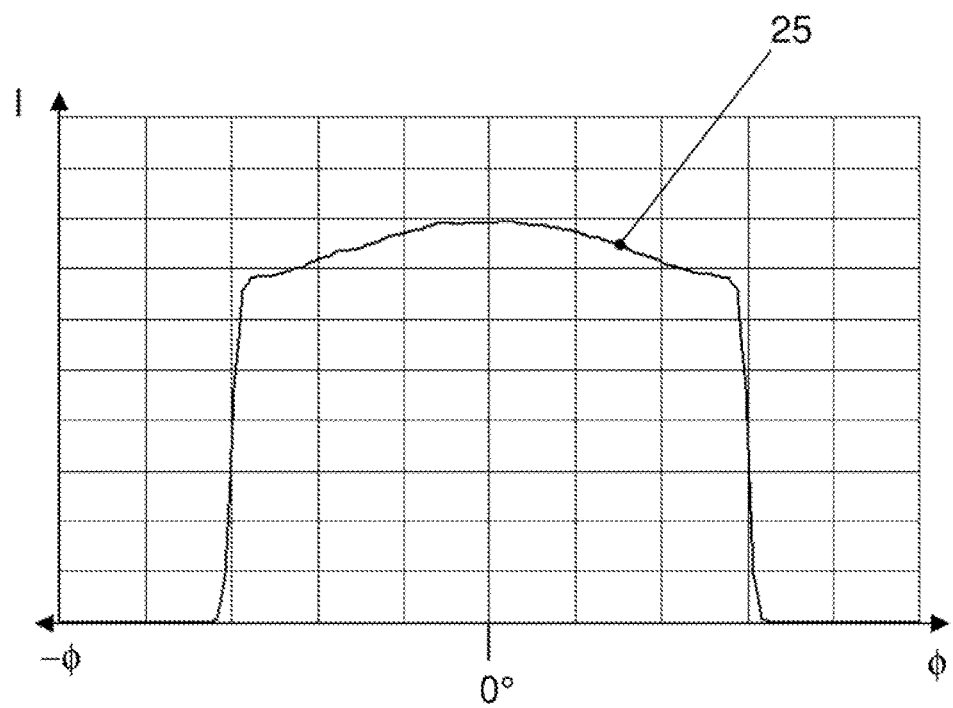
FIG. 11 shows an exemplary intensity distribution of the light exiting from the third homogenizing means.

At certain ratios of the dimensions of the waveguide 22 illustrated in FIG. 10, light can emerge from the waveguide 22 with an angular intensity distribution that corresponds to a convex top-hat profile 25 at least in one direction, as shown as an example in FIG. 11, which shows the intensity I as a function of an angle $\phi$, wherein the angle $\phi=0°$ corresponds to the average propagation direction of the light.

The waveguide 22 has a light-guiding region 26 in the form of a cuboid. However, the light-guiding region 26 may only in sections have a cuboid shape, in particular may have a rectangular shape only in one or more planes perpendicular to the average propagation direction Z of the light.

In order to obtain the aforementioned convex top-hat profile 25, in particular the extent $D_1$ of the light-guiding region 26 may be greater than the second and/or the third extent $D_2$, $D_3$ of the light-guiding region 26, preferably by a factor of at least 3, in particular at least 7, for example at least 10, and/or may preferably be greater by a factor of at most 100, in particular at most 50, for example at most 40.

FIG. 12 illustrates a lens 27 which transmits the laser light 13 emanating from a laser light source into the light-guiding region 26 of the waveguide 22. The focal lengths $f_{23}$, $f_{24}$ of the lenses 23, 24 have a mutual ratio of 1:2, so that the exit surface of the light-guiding region 26 is imaged onto the entry surface of the lens 10 with a magnification of a factor 2.

However, other focal length ratios may be selected in order to achieve a different magnification. For example, a ten-fold or a twenty-fold magnification is possible.

Only one lens of the lenses 10 for exposing the component 11 to laser radiation 13 is shown by way of example. However, the number of homogenizing means 21 should correspond to the number of lenses 10, so for example six homogenizing means 21 should be associated with six lenses 10 or, for example, eight homogenizing means 21 should likewise be associated with eight lenses 10.

The decrease in the angular intensity distribution 25 toward the edges corresponds approximately to a decrease proportional to $\cos^2(\phi)$. It turns out that with a number of lenses 10 less than eight, such a homogenized spatial intensity distribution or spatial distribution of the light on each of the lenses that decreases towards the edges especially with $\cos^2(\phi)$, leads to a very uniform intensity distribution on the component 11. It should be noted at this point that the decrease toward the edges occurs in a direction that corresponds to the circumferential direction of the component 11, or occurs in the direction in which the lenses 10 adjoin each other.

The reasons for selecting a spatial intensity distribution or spatial distribution of light that decreases towards the edges will now be explained with reference to FIGS. 13 to 15.

Figure 13:
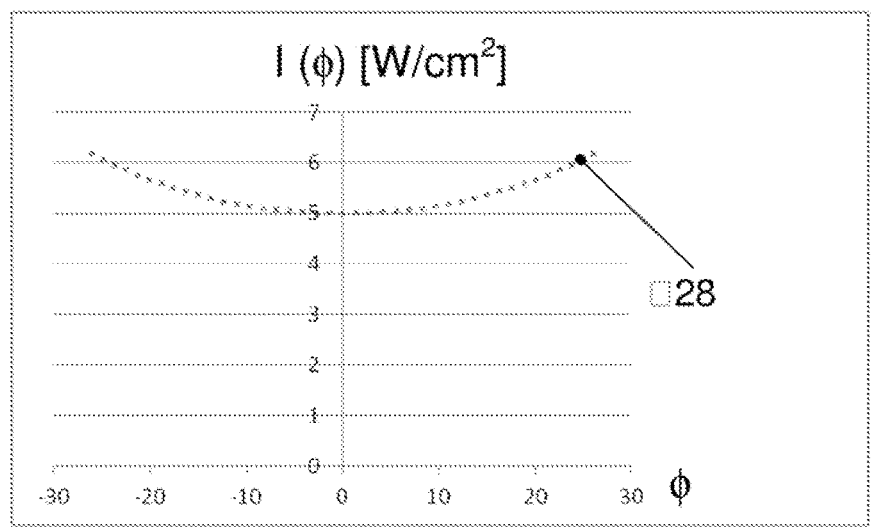
FIG. 13 shows a schematic illustration of the intensity distribution of the laser radiation on the component for an ideal lens, on which a linear top-hat distribution is incident.

FIG. 13 illustrates the intensity I of the laser radiation on the component 11 as a function of the angle $\phi$ for an ideal lens used as the lens 10, when the lens 10 is illuminated with collimated light and a linear top-hat distribution. $\phi=0°$ corresponds here to the light portion incident on the component 11 in the region of the optical axis of the lens 10. The illustrated intensity distribution 28 shows that the incident intensity for the edge regions of the section of the component 11 illuminated by the lens 10 is greater than for the central regions, which are arranged near the optical axis.

Figure 14:
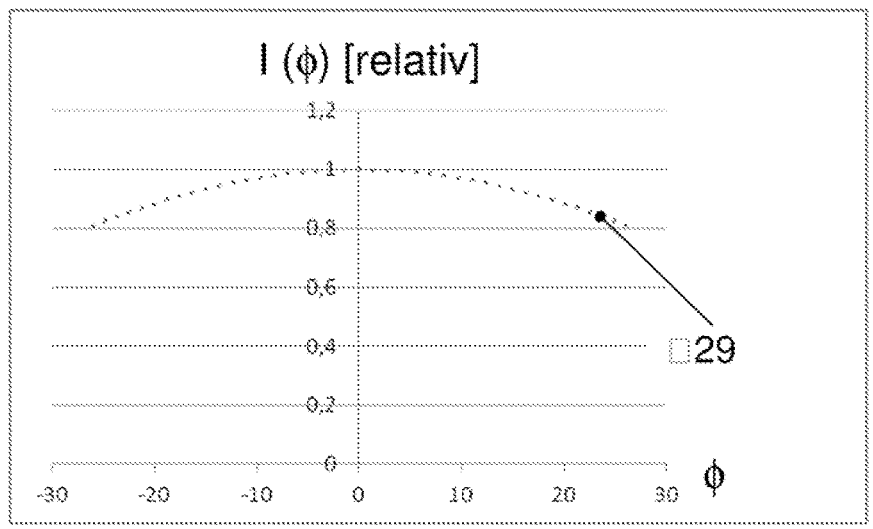
FIG. 14 shows a schematic illustration of an intensity distribution of the of the laser radiation on the ideal lens that decreases towards the edges.

FIG. 14 shows a spatial intensity distribution 29, or a spatial distribution on the lens 10 in relative units, wherein the magnitude of the intensity I in the region of the optical axis is set to 1. The intensity I decreases to the edges to about 80% of the value at the optical axis. The spatial intensity distribution 29 could be generated, for example, by using the homogenizing means 21 shown in FIG. 12.

Figure 15:
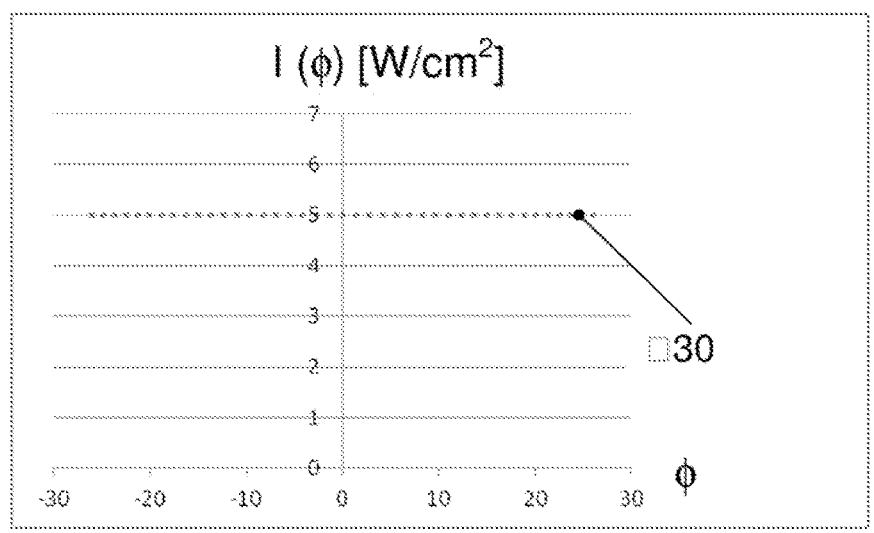
FIG. 15 shows a schematic illustration of the intensity distribution of the laser radiation on the component for an ideal lens, on which an intensity distribution according to FIG. 15 is incident.

FIG. 15 illustrates the intensity I of the laser radiation on the component 11 as a function of the angle $\phi$ when an ideal lens is used as the lens 10 and when this lens is illuminated with collimated light that not have a linear top-hat distribution, but instead has the distribution 29 shown in FIG. 14. It turns out that the intensity distribution 30 obtained on the component 11 has in this case the same intensity I at all angular ranges. This ensures a very uniform illumination of the component 11 with laser radiation.

When the ideal lens used for the representation of the lens 10 is substituted by a real lens or an F-theta lens, the shape of the spatial intensity distribution 29 on the lens 10 must be adapted at its deviation from an ideal lens.

A likewise comparatively well homogenized intensity distribution that decreases mainly with $\cos^2(\phi)$ toward the edges can be achieved with the aforementioned slow-axis distribution of laser diode bars. If the use of homogenizing means is to be dispensed with and the number of lenses 10 is less than eight, it is recommended to illuminate the entrance faces of the lenses 10 with the slow-axis distribution of laser diode bars. Once more, the slow axis should be disposed parallel to the circumferential direction of the component 11 or be arranged parallel to the direction in which the lenses 10 adjoin each other.

If the number of lenses 10 is greater than or equal to eight, a uniform intensity distribution on the component 11 can also be achieved with a linear top-hat distribution or with a non-decreasing intensity distribution, which can be obtained, for example, with the homogenizing means 14, 18 shown in FIG. 8 and FIG. 9.

The invention claimed is:

1. A device for applying laser radiation (13) to an outside surface of a rotationally symmetrical component (11, 11', 11"), comprising a plurality of lenses (10), through which the laser radiation (13) passes and which are designed and/or are arranged in such a way that an axis of symmetry (12, 12', 12") of the component (11, 11', 11") is located at a focal point of each of the lenses (10).

2. The device according to claim 1, wherein the device comprises homogenizers (14, 18, 21), one homogenizer associated with each of the lenses (10), homogenizing the laser radiation (13) before passing through each of the lenses (10).

3. The device according to claim 2, wherein when a number of the lenses (10) is less than eight, the homogenizers (14, 18, 21) are designed such that the laser radiation (13) has a top-hat intensity distribution wherein intensity decreases toward edges according to cos 2 (φ), and wherein, when a number of the lenses (10) is greater than or equal to eight, the homogenizers (14, 18, 21) are designed such that the laser radiation (13) has a linear top-hat intensity distribution.

4. The device according to claim 2, wherein the homogenizers (14,18) comprise at least one lens array (15, 16) or a light guide (19).

5. The device according to claim 4, wherein the homogenizers (14, 18) comprise two lens arrays (15, 16).

6. The device according to claim 2, wherein the homogenizer (21) comprises a waveguide (23) having at least partially cuboidal light-guiding region (26).

7. The device according to claim 6, wherein a first extent ($D_1$) of the light-guiding region (26) that extends between an entrance face and an exit face of the light-guiding region (26) is greater than a second ($D_2$) and/or a third extent ($D_3$) that is perpendicular to the first extent ($D_1$) of the light-guiding region (26).

8. The device according to claim 7, wherein first extent ($D_1$) of the light-guiding region (26) that extends between an entrance face and an exit face of the light-guiding region (26) is greater than a second and/or third extent ($D_2$, $D_3$) that is perpendicular to the first extent ($D_1$) of the light-guiding region (260), by a factor of at least 3.

9. The device according to claim 8, wherein the factor is between at least 7 and at most 100.

10. The device according to claim 2, wherein the device comprises an optical arrangement to expose at least one of the lenses (10) to laser radiation (13).

11. The device according to claim 10, wherein the optical arrangement and/or the homogenizer (14, 18, 21) are designed such that an entrance face of each of the lenses (10) is exposed to a homogeneous spatial distribution or to a homogeneous spatial intensity distribution of the laser radiation (13).

12. The device according to claim 10, wherein the optical arrangement and/or the homogenizer (14, 18, 21) are designed such that an entrance face of each of the lenses (10) is exposed to a homogeneous spatial distribution or to a homogeneous spatial intensity distribution of the laser radiation (13) matching a design of the lens (10).

13. The device according to claim 10, wherein the homogenizers (14, 18, 21) are encompassed by the optical arrangement.

14. The device according to claim 10, wherein the optical arrangement comprises a collimator.

15. The device according to claim 14, wherein the collimator comprises at least one lens for collimation, which is designed and arranged in the device such that the laser radiation is incident on the lenses (10) with no divergence or with the smallest possible divergence, or is at least substantially collimated.

16. The device according to claim 2, wherein the lenses (10) are arranged in the circumferential direction next to one another.

17. The device according to claim 16, wherein the lenses (10) adjoin one another, with respect to the axis of symmetry (12, 12', 12") of the component (11, 11', 11").

18. The device according to claim 2, wherein at least one of the lenses (10) are arranged so that the direction in which the laser radiation (13) propagates after passing through the at least one of the lenses (10) has with respect to the axis of symmetry (12, 12', 12") of the component (11, 11', 11") both a radial and an axial component.

19. The device according to claim 2, wherein each of the lenses (10) is arranged lenses (10) has with respect to the axis of symmetry (12, 12', 12") of the component (11, 11', 11") both a radial and an axial component.

20. The device according to claim 1, wherein each of the lenses (10) has for the laser radiation (13) an enhance face facing away from the component (11, 11', 11") and an exit face facing the component (11, 11', 11").

21. The device according to claim 1, wherein at least two the lenses (10) have an identical focal length (f).

22. The device according to claim 1, wherein at least one of the lenses (10) are cylindrical lenses having cylinder axes that are parallel to the axis of symmetry (12, 12', 12") of the component (11, 11', 11").

23. The device according to claim 1, wherein at least one of the lenses (10) have a rotationally-symmetrical curvature.

24. The device according to claim 23, wherein at least one of the lenses (10) have a rotationally-symmetrical curvature.

25. The device according to claim 24, wherein at least one of the lenses (10) are spherical lenses (10).

26. The device according to claim 24, wherein the lenses (10) are spherical lenses (10).

27. The device according to claim 1, wherein each of the lenses (10) has an identical focal length (f).

28. The device according to claim 1, wherein the device comprises an optical arrangement to expose each of the lenses (10) to laser radiation (13).

29. The device according to claim 1, wherein the lenses (10) are cylindrical lenses having cylinder axes that are parallel to the axis of symmetry (12, 12', 12") of the component (11, 11', 11").

30. The device according to claim 1, wherein each of the lenses (10) has a rotationally-symmetrical curvature.

31. The device according to claim 1, wherein the plural lenses (10) are three or more lenses arranged in a closed geometric configuration with the plural lenses (10) adjoining at corners of the closed geometric configuration with the component (11, 11', 11") enclosed by the geometric configuration.

32. The device according to claim 1, wherein none of the laser radiation bypasses the component (11, 11', 11").

33. The device according to claim 1, wherein an entire angular space of a circumference of the component (11, 11', 11") is illuminated, and wherein a numerical aperture of the plural lenses (10) is determined as follows:

$$NA = \sin(\alpha/2)$$

with $\alpha = 360°/\text{number of lenses}$.

* * * * *

UNITED STATES PATENT AND TRADEMARK OFFICE
CERTIFICATE OF CORRECTION

PATENT NO. : 9,746,677 B2  
APPLICATION NO. : 14/890145  
DATED : August 29, 2017  
INVENTOR(S) : Thomas Mitra Page 1 of 1

It is certified that error appears in the above-identified patent and that said Letters Patent is hereby corrected as shown below:

In the Claims

Column 9, Line 52, Claim 8 change "(260)" to --(26)--.

Column 10, Line 28, Claim 19 after "arranged" insert --so that the direction in which the laser radiation (13) propagates after passing through each of the--.

Column 10, Line 32, Claim 20 change "enhance" to --entrance--.

Signed and Sealed this  
Thirty-first Day of October, 2017

Joseph Matal  
*Performing the Functions and Duties of the*  
*Under Secretary of Commerce for Intellectual Property and*  
*Director of the United States Patent and Trademark Office*